United States Patent Office 3,449,408
Patented June 10, 1969

3,449,408
PREPARATION OF ESTERS BY CARBONYLATION OF ALCOHOLS
Herman S. Schultz, Easton, Pa., assignor to GAF Corporation, New York, N.Y., a corporation of Delaware
No Drawing. Continuation of application Ser. No. 136,157, Sept. 6, 1961. This application Nov. 22, 1966, Ser. No. 596,343
Int. Cl. C07c *69/00, 67/04, 67/00*
U.S. Cl. 260—488
9 Claims

ABSTRACT OF THE DISCLOSURE

A process for the synthesis of esters of carboxylic acids which comprises reacting a material selected from aliphatic alcohols and alicyclic alcohols, in the liquid phase, with carbon monoxide in the presence of concentrated sulfuric acid, thereafter reacting the resulting reaction mixture in the absence of any substantial amount of free carbon monoxide with an aliphatic alcohol, and separating the resulting carboxylic acid ester from the reaction mixture.

---

This application is a continuation of co-pending application Ser. No. 136,157, filed Sept. 6, 1961.

This invention relates to a novel process for the preparation of esters. More particularly, it relates to a process for the direct preparation of esters from the reaction products of alcohols and corresponding olefins with carbon monoxide in concentrated sulfuric acid followed by pouring the reaction mixture into an excess of either the same or a different alcohol.

Carboxylic acid esters find a wide and varied use in such fields as solvents, plasticizers, chemical reagents, surface active agents, synthetic perfumes, and the like. In the constant search for improved members of these classes it is frequently necessary to synthesize novel carboxylic acids for the purpose of making esters having special properties. Such acids are frequently difficult to synthesize, and are also frequently difficult to isolate and purify. Furthermore, during the isolation and purification procedures there is always a loss of some of the product.

It is therefore one object of the present invention to provide a process for simply and efficiently synthesizing "tailor made" esters.

Another object is to provide a process for reducing the number of steps necessary to synthesize esters by eliminating the intermediate recovery and purification of the carboxylic acid.

Still another object is to provide a novel process for producing esters in high yields and purity with a minimum of side reactions.

Other objects and advantages will become apparent from the description of the invention which follows.

In accordance with the present invention a process is provided for directly synthesizing novel esters by reacting an aliphatic, alicyclic, or substituted alicyclic alcohol or an olefin corresponding thereto with carbon monoxide in the presence of concentrated sulfuric acid and then pouring the reaction mixture into an excess of the same or a different alcohol. The first named step results in the introduction of a carbonyl group at the site of the hydroxyl group of aliphatic, alicyclic or substituted alicyclic alcohol or the addition of a carbonyl group to the olefinic unsaturation. When, in the second step, the reaction mixture is poured into an excess of either the same or different alcohol, an ester of the latter and the intermediate produced in the first step is obtained. In most instances, separation of the ester from the reaction mixture as an azeotrope with some of the excess of alcohol presents no difficulty to the recovery of the ester in high yields and purity.

Without being limited thereby, or held to the correctness of the explanation given below, it is believed the reactions involved take the following probable course:

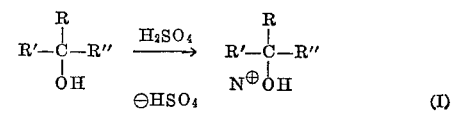

(I)

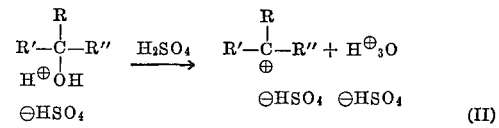

(II)

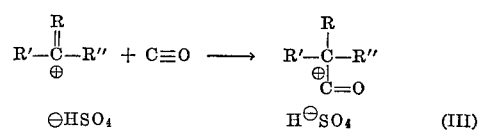

(III)

In the above equations,

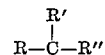

represents the hydrocarbon residue of the aliphatic, alicylic, or substituted alicyclic alcohol

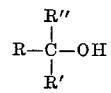

The prouct of Equation III above is an acylium bi sulfate which resulted from the addition of carbon monoxide to the intermediate carbonium ion. If the carbonium ion is primary, it will become secondary or tertiary before reaction with carbon monoxide unless there is a structural restriction inhibiting such as isomerization.

Thus, it is possible to obtain any desired ester by adding the above mentioned reaction mixture directly to any alcohol.

It will be apparent from the foregoing discussion that the method not only provides a convenient direct synthesis of esters, but also provides a method for increasing the length of an aliphatic chain by one carbon. Thus, it is possible, by adding carbon monoxide to any given alcohol to obtain a carboxylic acid which, on reduction, yields an alcohol having one more carbon in the chain than the starting alcohol.

In general, in accordance with the present invention, the reaction is carried out by slowly and continuously adding the alcohol to the sulfuric acid with very rapid stirring and dispersion in an autoclave which is preferably pressured with carbon monoxide. While it is possible to first add all of the alcohol to the sulfuric before pressuring with carbon monoxide, the former procedure is preferred because higher yields are obtained.

The sulfuric acid to alcohol or olefin mole ratio should be greater than 3 to 1, preferably greater than 4½ to 1, while the concentration of the sulfuric acid should be between 93 and 100%, preferably from 95 to 99%.

Carbon monoxide pressure can vary considerably, a range of about from 500 to 2500 p.s.i.g. has been found suitable in most instances.

The temperature of the carboxylation reaction can vary between 10 and 90° C., with a range of 40 to 70° C. being preferred.

Because of its extreme insolubility in concentrated sulfuric acid, it is essential that the carbon monoxide be brought into contact and reacted with the alcohol or corresponding olefin in the sulfuric acid and dispersed throughout the latter as rapidly as possible before competing reactions, such as sulfonation, sulfation, and polymerization can assume sufficient proportions to materially decrease the yield and to introduce contaminating products of side reactions. Rapid dispersion can be accomplished by means of any one of a number of commercially available devices which are capable of causing rapid intimate contact between a gas and a liquid. It will be apparent that the better the dispersion of the carbon monoxide through the sulfuric acid, the higher the temperature and shorter the time can be at which the reaction takes place; thus avoiding as much as possible the objectionable side reactions previously mentioned.

As indicated above, the reaction is a general one and is applicable to any alcohol, especially aliphatic, alicyclic, or substituted alicyclic alcohols or to olefins. Thus, for example, ethyl, n-propyl, iso-propyl, and tert-butyl alcohols can be converted according to this process to any desired ester of propionic, isobutyric, and trimethyl acetic acid, respectively. Note n-propyl and iso-propyl lead to iso-butyric. Cyclohexanol or substituted cyclohexanol can be converted to any desired ester of cyclohexylcarboxylic acid or of the corresponding substituted cyclohexylcarboxylic acid.

Instead of the aforementioned alcohols used as starting materials, the carboxylic acid can also be made from an olefin. Thus, for example, esters of isobutyric acid can be made from propylene and esters of trimethylacetic acid can be made from isobutylene.

In order that the invention may be more readily understood, the following examples are presented for purposes of illustration. However, it will be apparent that the scope of the invention is not limited thereby; but is applicable to any alcohol in the stated classes or corresponding olefin.

EXAMPLE 1

600 grams of 96.8% sulfuric acid (6 moles) was charged into a one-liter steel autoclave equipped with a "Dispersimax" mixing and gas dispersion unit. The autoclave was closed and carbon monoxide was added until pressure rose to 1500 p.s.i.g. at a temperature of 22° C. 70 grams (1.167 moles) of isopropyl alcohol was added slowly and continuously over a period of 2½ hours. During this time, the solution was stirred constantly at 500 r.p.m. The autoclave was heated to a temperature between 49 and 53° C. Carbon monoxide was added several times during the course of the reaction to maintain the pressure between 1450 and 1500 p.s.i.g. Addition of the isopropyl alcohol was accomplished by means of a high pressure dropping funnel.

After all of the isopropyl alcohol had been added, stirring and heating were continued for four hours longer. At the end of the time, the contents of the autoclave were cooled and then discharged into one liter of methanol with shaking and cooling to prevent an excess rise in temperature. The resulting solution was permitted to stand at room temperature for three hours and then diluted with water, salted and finally extracted with diethyl ether. The ether extract was dried over sodium sulfate and then stripped of ether by means of a Snyder ball column.

Potentiometric acid and saponification number determinations showed that, at this point the crude product contained 75.6% methyl isobutyrate and 8.2% isobutyric acid. The crude product also contained methanol and a small amount of water.

Heptane was then added to the solution to break the methyl isobutyrate-methanol azeotrope and the mixture distilled by means of a fractionating column. The fraction boiling at 90–100° C. ($n_D^{25}$ 1.3872–1.3810) was collected, and this contained 61% of the theoretical yield of methyl isobutyrate. Most of this fraction boiled at 91–94° C.; $n_D^{25}$ 1.3845–1.3810.

The isobutyric acid was recovered from the fraction boiling at 140–151° C.; $n_D^{25}$ 1.3910–1.3911, most of which boiled at 150–151° C. ($n_D^{25}$ 1.3910–1.3911).

EXAMPLE 2

600 grams of a 96.3% sulfuric acid was charged into an autoclave equipped with a gas dispersing device, high speed stirrer, and a high pressure dropping funnel, as in Example 1. Carbon monoxide was admitted until the pressure rose to 1400–1500 p.s.i.g. The solution was then heated to a temperature of 45–48° C. and 70 grams (1.167 moles) of isopropyl alcohol added over a period of two hours and five minutes. Pressure reached a constant value one half hour after addition of the isopropyl alcohol was completed. Stirring at 500 r.p.m. and heating were continued for 2½ hours longer, after which time the contents of the autoclave were permitted to cool and then slowly poured into one liter of methanol, allowed to stand for one hour, and then diluted with water and ice. The water solution was salted, extracted with ether, dried over sodium sulfate, and then stripped of ether in a Snyder ball column.

Potentiometric acid saponification number determinations showed that the crude product contained 77.2% methyl isobutyrate and 11.7% isobutyric acid. Fractionation of this crude product was accomplished as described in Example 1, and the cuts were shown to be methyl isobutyrate and isobutyric acid by means of infra-red spectra.

EXAMPLE 3

The procedure of Example 2 was repeated except that 49 grams of propylene was used in place of 70 grams of isopropyl alcohol. The methyl isobutyrate was isolated in the same manner.

It is to be understood that the foregoing detailed description is given merely by way of illustration and that many variations may be made therein without departing from the spirit of this invention.

What is claimed is:

1. The process for the synthesis of alkyl esters of carboxylic acids which comprises reacting an unsubstituted alkanol having from three to six carbon atoms to the molecule, in the liquid phase, with carbon monoxide in the presence of concentrated sulfuric acid having a concentration above 93%, in the absence of added water, at a temperature of from about 10° to about 90° C., at a pressure of from about 500 to about 2500 p.s.i.g., said sulfuric acid being present in molecular excess relative to said unsubstituted alkanol, thereafter reacting the resulting reaction mixture with an alkanol having from one to six carbon atoms to the molecule in the absence of any substantial amount of free carbon monoxide, and separating an ester of a carboxylic acid from the resulting reaction mixture.

2. The process in accordance with claim 1 wherein said alkanol having from one to six carbon atoms reacted with said reaction mixture obtained by reacting said alkanol having from three to six carbon atoms with carbon monoxide is methanol.

3. The process in accordance with claim 2 wherein said reaction of said alkanol having from three to six carbon atoms with carbon monoxide is executed at a temperature of from about 20° to about 60° C.

4. The process for the synthesis of esters of carboxylic acids which comprises reacting a compound selected from the group consisting of unsubstituted alkanols having from three to six carbon atoms and cyclohexanol, in liquid phase, with carbon monoxide in the presence of concentrated sulfuric acid having a concentration between 93 and 100% wherein the mol ratio of said acid to the reactant compound is greater than 3:1, at a temperature of from about 10° to 90° C. at superatmospheric pressure, thereafter reacting the resultant reaction mixture with a compound selected from the group consisting of unsubstituted alkanols having from three to six carbon atoms and cyclohexanol and separating a carboxylic acid ester from the resulting reaction mixture.

5. The process in accordance with claim 4 wherein the superatmospheric pressure is from about 500 to about 2500 p.s.i.g.

6. The process for the synthesis of alkyl esters of carboxylic acids which comprises reacting an alkanol having from three to six carbon atoms in the molecule, in the liquid phase, with carbon monoxide in the presence of concentrated sulfuric acid having a concentration of between 93 and 100% wherein the mol ratio of said acid to the reactant compound is greater than 3:1 at a temperature of from about 10° to about 90° C. at a pressure of from about 500 to about 2500 p.s.i.g. thereafter reacting the resulting reaction mixture with an alkanol having from one to six carbon atoms in the molecule, and separating an ester of carboxylic acid from the resulting reaction mixture.

7. The process in accordance with claim 6 wherein said alkanol having from one to six carbon atoms reacted with said reaction mixture obtained by reacting said alkanol having from three to six carbon atoms with carbon monoxide, is methanol.

8. The process for the production of alkyl esters of isobutyric acid which comprises reacting isopropyl alcohol with carbon monoxide in the presence of concentrated sulfuric acid having a concentration between 93% and 100% wherein the mol ratio between said acid and the reactant compound is greater than 3:1 at a temperature of from about 10° to about 90° C. at a pressure of from about 500 to about 2500 p.s.i.g., thereafter reacting the resulting reaction mixture with a lower alkanol at substantially atmospheric pressure, and separating the alkyl ester of isobutyric acid from the resulting reaction mixture.

9. The process in accordance with claim 8 wherein the lower alkanol reacted with said reaction mixture obtained by reacting said isopropyl alcohol with carbon monoxide, is methanol.

References Cited

UNITED STATES PATENTS 2,986,577   5/1961   Kurhajec _____ 260—488

OTHER REFERENCES

Emmett: "Catalysis," vol. 5, Reinhold Pub. Corp., N.Y. (1957), pp. 6–14.

Koch: "Brennstoff-Chemie," vol. 36, pp. 321–328 (1955).

Puzikee et al.: "J. Gen. Chem. USSR," vol. 29 (1959), pp. 3019–3026.

Eidus et al.: "Dok. Akad. Nauk USSR," vol. 120, No. 2, pp. 323–325 (1958).

Koch et al.: "Liebig's Annalen Der Chemie," vol. 618 (1958), pp. 251–266.

LORRAINE A. WEINBERGER, Primary Examiner.

V. GARNER, Assistant Examiner.

U.S. Cl. X.R.

260—468, 497, 514, 531, 533